(12) United States Patent
Kirschner et al.

(10) Patent No.: US 7,679,888 B2
(45) Date of Patent: Mar. 16, 2010

(54) THIN SCREEN ENCLOSURE

(76) Inventors: Mitchell Kirschner, 7235 Creveling Dr., St. Louis, MO (US) 63130; Ethan Schuman, 8528 Groby Rd., St. Louis, MO (US) 63122

( * ) Notice: Subject to any disclaimer, the term of this patent is extended or adjusted under 35 U.S.C. 154(b) by 88 days.

(21) Appl. No.: 11/795,836

(22) PCT Filed: Jan. 23, 2006

(86) PCT No.: PCT/US2006/002220

§ 371 (c)(1),
(2), (4) Date: Jul. 23, 2007

(87) PCT Pub. No.: WO2004/075684

PCT Pub. Date: Sep. 10, 2004

(65) Prior Publication Data

US 2008/0165481 A1   Jul. 10, 2008

Related U.S. Application Data

(60) Provisional application No. 60/646,281, filed on Jan. 24, 2005.

(51) Int. Cl.
*G06F 1/16* (2006.01)
(52) U.S. Cl. .......... 361/679.01; 5/53.1; 312/7.2
(58) Field of Classification Search ........ 361/679.01, 361/679.02; 5/503.1; 312/7.2
See application file for complete search history.

(56) References Cited

U.S. PATENT DOCUMENTS

| 2,476,494 | A | * | 7/1949 | Jones et al. | 348/789 |
|---|---|---|---|---|---|
| 4,400,736 | A | * | 8/1983 | Weiss | 348/789 |
| 4,735,467 | A | | 4/1988 | Wolters | |
| 5,273,352 | A | * | 12/1993 | Saper | 312/7.2 |
| 5,940,930 | A | | 8/1999 | Oh et al. | |
| 6,361,131 | B1 | | 3/2002 | Powell, Jr. | |
| 6,612,670 | B2 | | 9/2003 | Liu | |
| 6,733,094 | B1 | * | 5/2004 | Chang | 312/7.2 |
| 7,142,270 | B2 | * | 11/2006 | Yamauchi et al. | 349/113 |
| 7,221,092 | B2 | * | 5/2007 | Anzai et al. | 313/506 |

(Continued)

FOREIGN PATENT DOCUMENTS

CN      86202137 U      10/1987

(Continued)

OTHER PUBLICATIONS

International Search Report; Appln No. PCT/US06/02220, International filing date Jan. 23, 2006 (3 pages).

(Continued)

*Primary Examiner*—Lisa Lea-Edmonds
(74) *Attorney, Agent, or Firm*—Polster, Lieder, Woodruff & Lucchesi LC

(57) ABSTRACT

A modular container (2) for a flat display panel (3) has a mounting shelf (55) for the panel and power means (48) for selectively raising and lowering the mounting shelf and vertical channels (108) or geared tracks in the container positioned to receive side edges of the panel and adjustable laterally to accommodate panels of different widths. A modular container for a flat display panel has a mounting shelf for the panel and power means for selectively raising and lowering the mounting shelf and remotely controlled power means (32, 76), for moving said container with respect to a seated or recumbent person.

10 Claims, 5 Drawing Sheets

U.S. PATENT DOCUMENTS

2002/0101139 A1    8/2002    Lee
2003/0205951 A1*    11/2003    Lambert .................... 312/7.2
2006/0075550 A1*    4/2006    Hanson ....................... 5/53.1

FOREIGN PATENT DOCUMENTS

| CN | 2557025 Y | 6/2003 |
|---|---|---|
| CN | 2577694 Y | 10/2003 |
| DE | 20300344 | 4/2003 |
| GB | 2406506 | 6/2005 |
| JP | 2002010174 | 1/2002 |

OTHER PUBLICATIONS

The Chicago TV Bed—More Details; Mayflower Designs—Chicago Automated Range—Inventive design for modern living. http://www.mayflowerdesigns.com/chicago/chicago_tv_bed_details.htm; Jun. 16, 2005.

PCT/US2004/005700 published Oct. 9, 2004.

Office Action in Chinese Patent Application No. 2006800056072.

\* cited by examiner

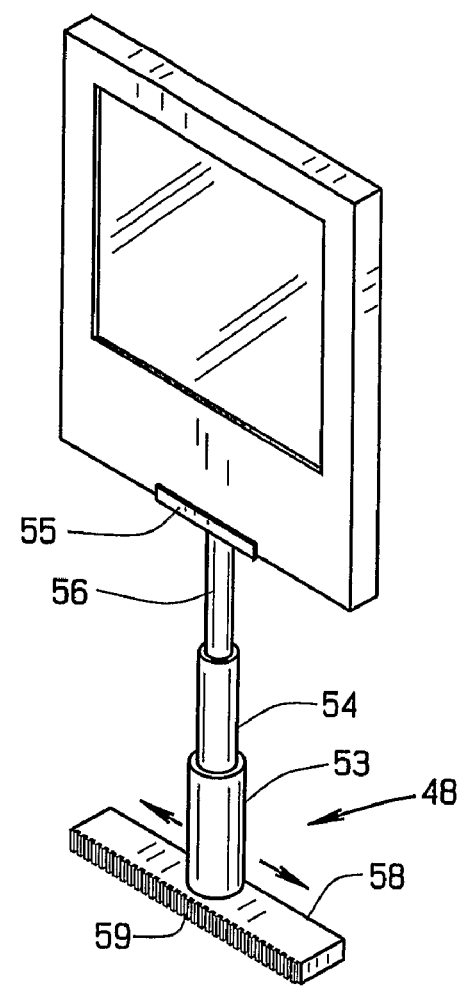
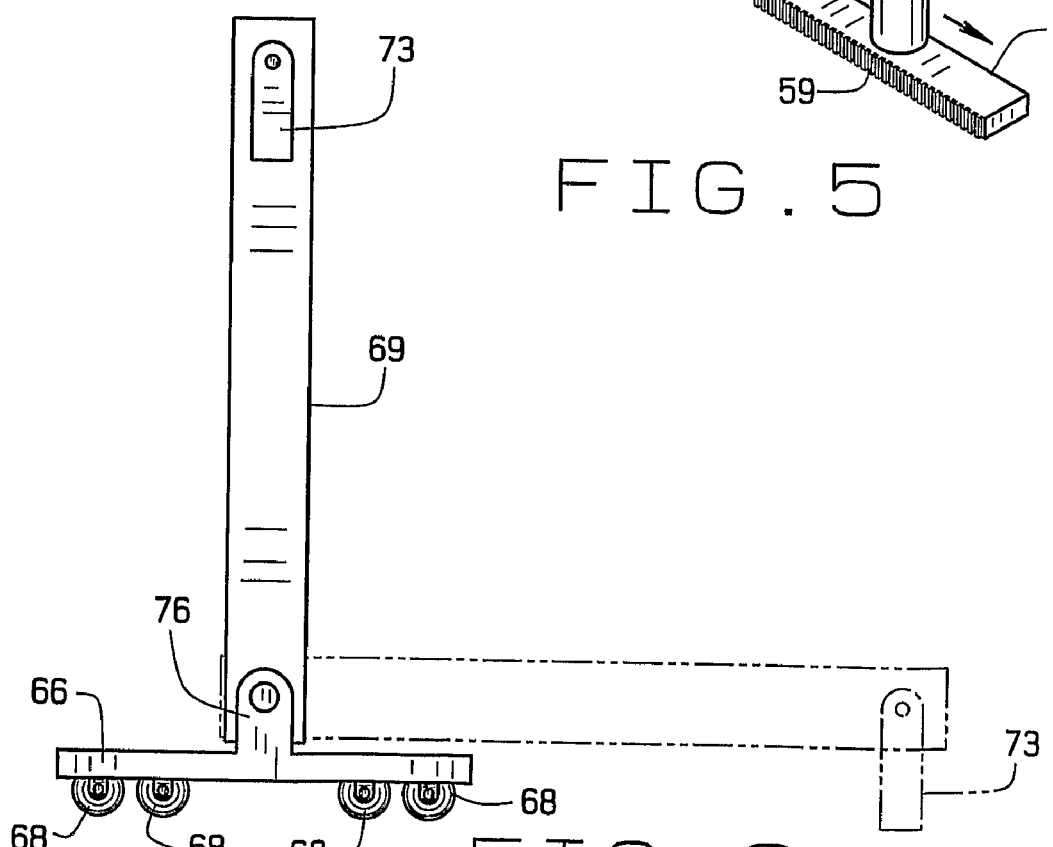
FIG.5
FIG.6

THIN SCREEN ENCLOSURE

CROSS REFERENCE TO RELATED APPLICATIONS

This application is the United States national stage filing under 35 U.S.C. §371 of International Application No. PCT/US2006/002220, filed Jan. 23, 2006, which claims priority from U.S. provisional application Ser. No. 60/646,281, filed Jan. 24, 2005, all of which are incorporated herein by reference.

BACKGROUND ART

With the advent of thin screen monitors for televisions and computers, the broad idea of providing means for storing such a screen and raising it by some mechanical device to full view has been the source of a number of patents, one of the earliest of which is U.S. Pat. No. 4,735,467, which issued to Westinghouse Electric Corp. in 1988. The screen of that patent is concealed in a desk, and raised by means of a drive chain, driven by an electric motor. In U.S. Pat. No. 6,733,094, a computer screen is mounted in a desk in one embodiment, and a television screen in a living room cabinet in another, in both cases raised and lowered by means of a pair of "adjusting screws" threaded into internally threaded bosses at the ends of a transverse bar on which a screen is mounted. U.S. Pat. No. 6,612,670 shows two other means for raising and lowering a thin screen: a belt, operated either manually or by an electric motor, and a scissors lift operated by a hydraulic motor. A pantograph or scissors jack type of lifting apparatus can be used or a rack and pinion, all as referred to in U.S. Pat. No. 6,361,131, for example. Although patent '670 shows a self-supporting panel holder, the panel is intended to be a partition, which can carry a monitor screen or the like, but which itself is not such a screen. Recent art includes UK application GB 2 406 506, published Apr. 6, 2005, PCT/US2004/005700, published Sep. 10, 2004, Gebrauchsmuster DE 203 00 344 U1, published Apr. 24, 2003, and Japanese patent JP 2002010174, published Jan. 11, 2002.

SUMMARY OF INVENTION

In a portable modular container for a flat display panel such as a thin screen television or computer monitor, the container having broad front and rear walls and relatively narrow side walls to define a space to receive the display panel, and a top that opens, a horizontal mounting member within the container, power mechanism for selectively raising and lowering the mounting member, a flat display panel carried by the horizontal mounting member, in one embodiment, vertical channels are positioned to receive side edges of the panel and can be movable with respect to the mounting member to accommodate display panels of different widths and to serve as guides for the panel when it is raised and lowered. The adjustable channels can be carried by container walls or by the horizontal mounting member. The "channels" can take the form of angle irons, or be made wide, with adjusting screws through the side wall, tipped with Teflon or the like, so that they can accommodate panels of different thicknesses, (see for example, the channel of FIG. 1). Any suitable elevating mechanism, of which there are many, as illustrated by the prior art, can be used.

In one embodiment, doors in at least one of the container walls are openable to reveal the panel and provided with a lock for locking the doors. In another embodiment, the panel is two-sided, to permit viewing of the same or different displays at the same time. At least one electrical fitting in a fixed wall of the container permits the panel and erecting mechanism to be electrically connected to a power source for manipulating the panel and for powering the panel, particularly in those applications in which the container is permanently mounted, as in a piece of furniture, and in portable units, for recharging a battery mounted in the container, or connecting the panel to a keyboard or for playing and recording devices such as DVD, VCR and video games as well as satellite, cable or the like.

In one embodiment, a modular container or enclosure for a flat display panel is provided that is readily portable, may be equipped with wheels, and may be hinged to fold down for storage under a bed, for example. The wheels may be motor driven to make the device self-propelled, or not. In any embodiment in which the wheels are power driven, control of the motor or motors powering the wheels can be provided at the module itself, or at a remote location. The latter arrangement is useful to permit easy viewing adjustment, either toward and away from the eye of the user, or transversely of the line of sight, with a remote switch, for example. In still another embodiment, the container is adapted to be connected to or to form an integral part of a bed or other piece of furniture. When adapted to be connected to or form an integral part of a bed, in another embodiment, means are provided for adjusting the focal distance of the container from the eyes of the user to achieve the ideal viewing distance when using larger flat display panels, or the lateral position of the screen, or both. If the device is a unitary, wheeled, remotely controlled container, clearly the distance from a seated or recumbent person can be varied simply by sending the appropriate signal to the wheels. In another embodiment, which has particular but not exclusive utility in connection with the bed mounted version with a screen on a 360° swivel mount or a double screen is provided, so that, for example in a hospital bed, the patient and guest can watch television or the doctor can be reviewing or inputting data at the foot end of the bed. In all of these embodiments, conventional mechanical means for raising and lowering the screen can be used. The raising and lowering mechanism has a bar or shelf that carries the screen. Preferably, the screen is positioned between upright channels, either carried by the case, outboard of the bar or shelf, or carried by the bar itself, in either case, as an option, the spacing of the channels can be adjusted laterally to accommodate screens of different widths. In yet another embodiment, which, again, may be combined with other embodiments, the container in which the screen is mounted, is provided with a door or doors, for viewing at a lower height, as well as at a higher position. The doors and the module can be locked to prevent unauthorized viewing of the screen, as by children, or to deter tampering with or theft of the screen. The doors can be hinged on the side or sides, top, or bottom, or can be arranged to slide vertically. Wireless transmitting and or receiving devices can be incorporated or attached to the display panel or contained in a module such as for example, WiFi, Blue Tooth, infrared, for cable, satellite or conventional tv reception, or for a video monitor for VCR, DVD, video game players, or for viewing security cameras for wireless remote speakers, or computers and their keyboards and printers, and so on. All can use wireless connections to transmit or received their respective tasks without the need for wire and cable connections, enabling the unit to be completely portable within the range of the respective device's transmitting reception range. Usefulness can be further enhanced with the inclusion of rechargeable batteries as an alternative to power cords, a computer screen, infrared, Ethernet, keyboard, printer, WiFi driver, and the like can be contained in a module with the screen. In all of these additional display module embodiments in which the screen is raised and lowered, flexible electrical conductors can also be mounted inside the container, to accommodate the raising and lowering of the screen and others, to connect the screen to a keyboard or television control, and so on, for example. These conductors are connected to the electrical fittings mounted in the wall or walls of the container. Accessories and attachments, such as aerials, and speakers, can also be contained in the container with the screen.

BRIEF DESCRIPTION OF THE DRAWINGS

In the drawings,

FIG. 4 is a view in perspective of an enclosure assembly with one broad side being translucent;

FIG. 5 is a view in perspective of a hydraulic lift mechanism on a rack base to permit lateral movement of the screen when it has cleared the upper edge of the enclosure;

FIG. 6 is a view in side elevation of a self-propelled enclosure, foldable for storage;

BEST MODES FOR CARRYING OUT THE INVENTION

Figure 1:
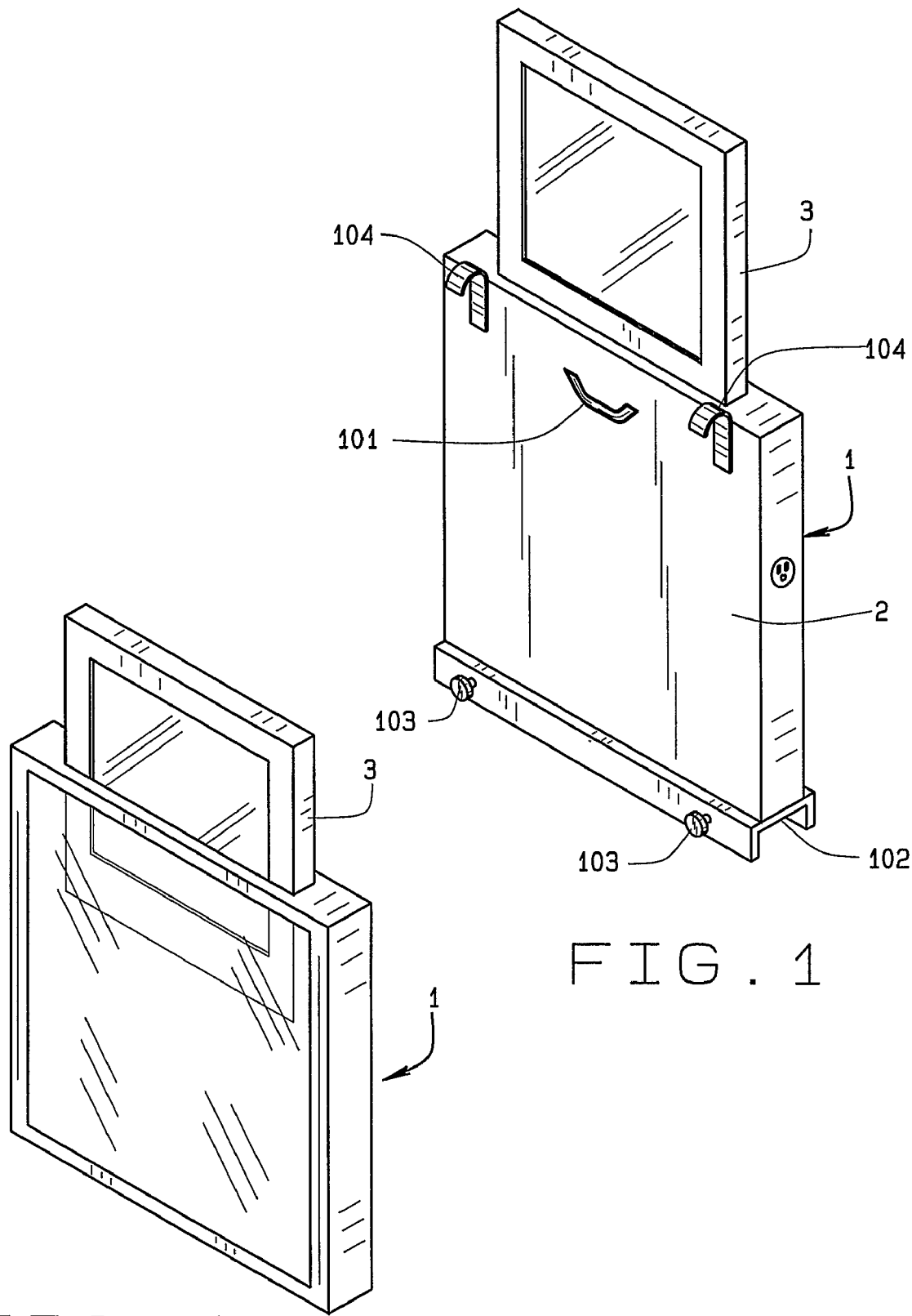
FIG. 1 is a view in perspective of a basic enclosure unit.

Referring now to the drawing for illustrative embodiments of this invention, in FIG. 1, reference numeral 1 indicates a basic unit, which includes an enclosure 2 in which a display panel 3, such as a plasma screen or computer flat screen is mounted, and an electrical fitting 4 in a narrow wall of the enclosure, to which electrical conductors, not here shown, are connected to an erecting mechanism for the screen and other fittings, not here shown, for electrical connections to the television set itself, to a battery recharger or to a keyboard in case the screen is part of a computer. In any embodiment in which a battery is used, space for the battery is provided, and an access door of some sort is provided to permit inspection and replacement of the battery. Handles 101 are provided for easy portability. An enlarged channel 102 at the bottom of the enclosure permits the enclosure to be mounted on a footboard or the like, a set screw or screws 103 serving to secure the enclosure to bed frames of different widths. The channel can be interrupted. Brackets 104 can be provided, either fixed or removable to hang enclosure on footboard or the like.

Figure 2:
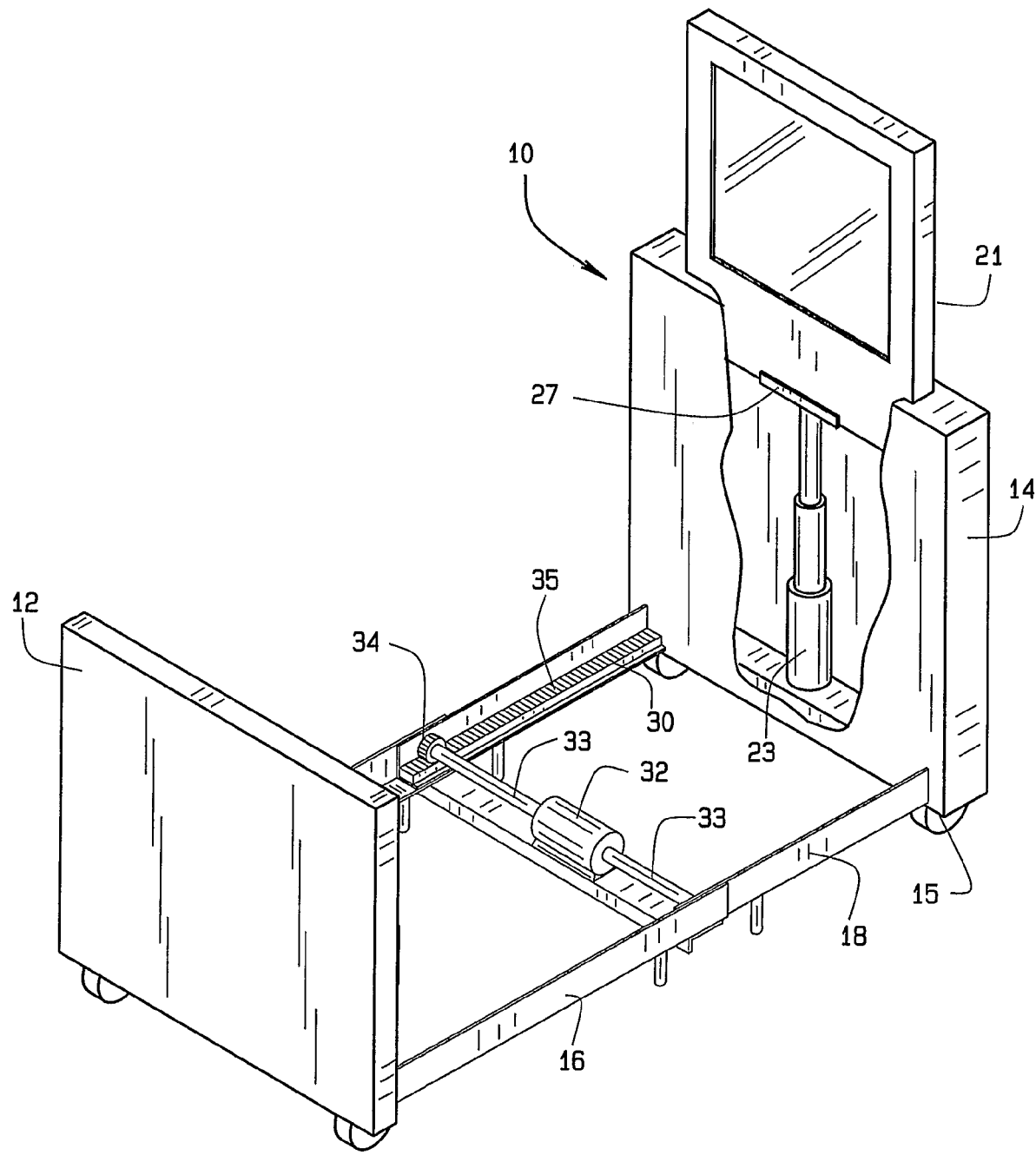
FIG. 2 is a somewhat diagrammatic view in perspective of a combination of enclosure and bed, with means for moving the unit toward and away from the head of a person in the bed.
Figure 3:
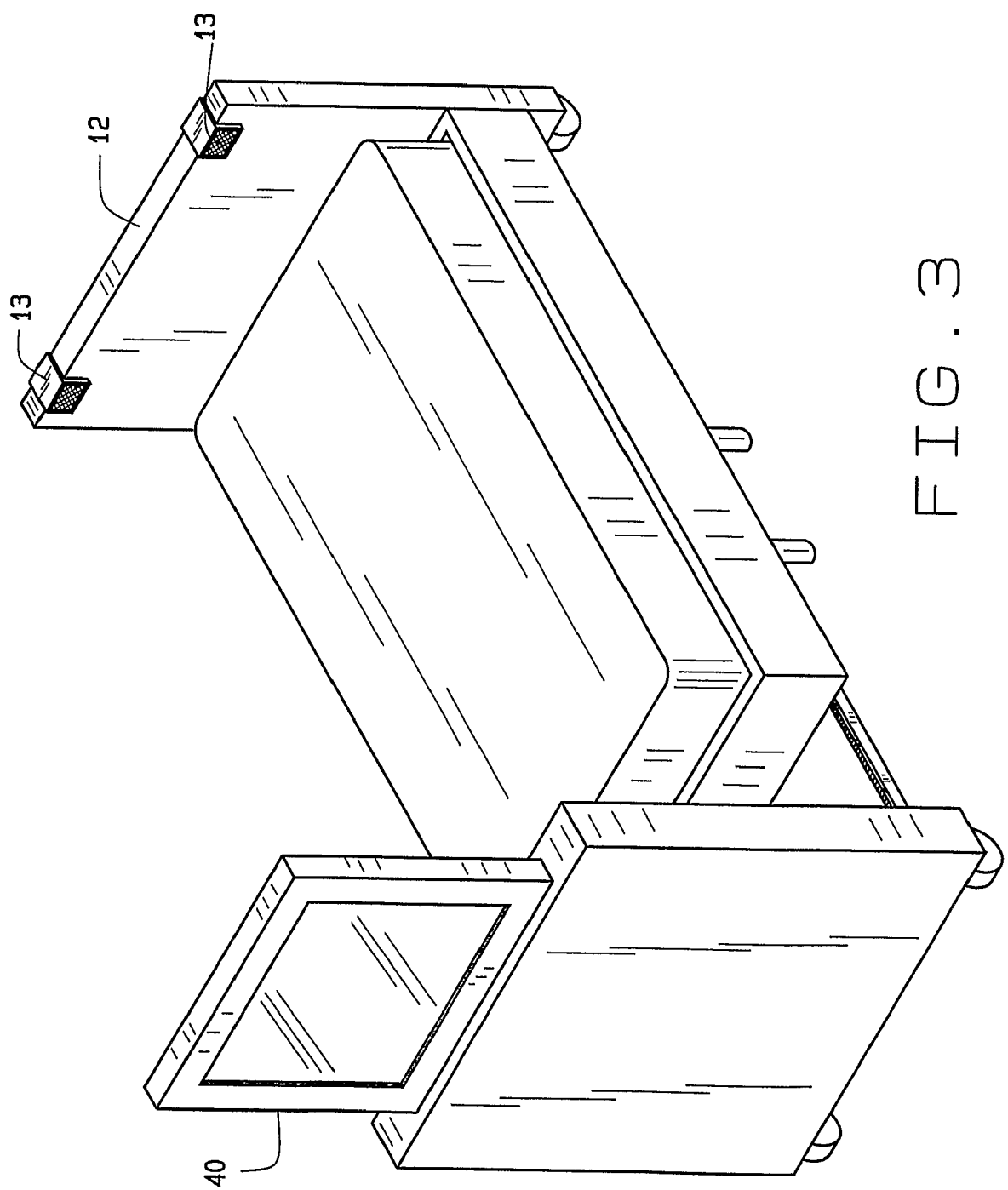
FIG. 3 is a view in perspective of a bed incorporating features of the bed of FIG. 2 with a two faced screen.

Referring to FIGS. 2 and 3, a bed 10 is shown with a headboard 12 on which flat speakers 13 are mounted, a footboard 14, on which an enclosure 20 with a display panel 21 is mounted, wheels 15 on the footboard, a fixed frame section 16 attached to the headboard end of the bed 10 and telescoping frame section 18 attached to the footboard 14. The display panel 21 is raised and lowered by a raising and lowering mechanism 23. The display panel 21 rests on a horizontal shelf 27, which is connected to be moved up and down by the mechanism 23.

A rack 35 is secured at one end to the footboard, and moved toward and away from the headboard by a motor 32, connected by shafts 33 to pinion 34, driving the rack 35. The rack is anchored to the foot of the bed, and the rack 35 moves toward the head, in an enclosure, not here shown. Alternatively, the shafts may be connected to drive a screw, anchored rotatable to the footboard. The footboard may be divided, with a center section movable out and in.

Referring to FIG. 3, a screen 40 is double faced, the two faces being separately controlled so that a person in bed can view one "screen" while a person on the outside of the bed can view another. This is particularly helpful in hospital beds where the patient can be watching a television program and the attending physician or nurse can view a chart or history on the other side.

In FIG. 4, screen enclosure has a translucent or transparent side, which swivel. The main cylinder 53 is mounted on a rack 58 for movement transverse of the enclosure in which it is mounted by a pinion 59, when the panel has provides the option to view the screen when it is in the enclosure at lower heights as well as the raised height. If the enclosure, with the translucent side, is enclosed in a cabinet with doors, if the erecting mechanism is deactivated and locked, the doors can be used as a way of limiting the viewing of the panel.

FIG. 5 illustrates a hydraulic lift mechanism 48. The hydraulic lift mechanism has telescoping segments 53, 54 and 56 which permit the shelf 55 to cleared the case. This is particularly useful in connection with a bed-mounted enclosure, because it permits moving the screen out of the way of someone sitting directly ahead of the person in bed, without having to lower the screen.

FIG. 6 illustrates a wheeled assembly 69, self-propelled, with ground-engaging wheels 68 driven by a motor or motors 76. The wheels are mounted on a base or feet 66 on which the motors 76 are mounted. The motors may have a housing that also serves as a hinge block on which an enclosure 71 is hinged to fold down for storage. To that end, a retractable foot 73 is provided at the upper end of the enclosure 71, to support the enclosure 71 when in its horizontal position. A manually sliding door can be mounted in channels for vertical movement. The wheels can be turned to move the screen in a direction parallel to the broad side of the container, or, to turn the container about one set of wheels, for example. These maneuvers can be controlled by a remote controller, as used in controlling toy racing cars, for example.

Figure 7:
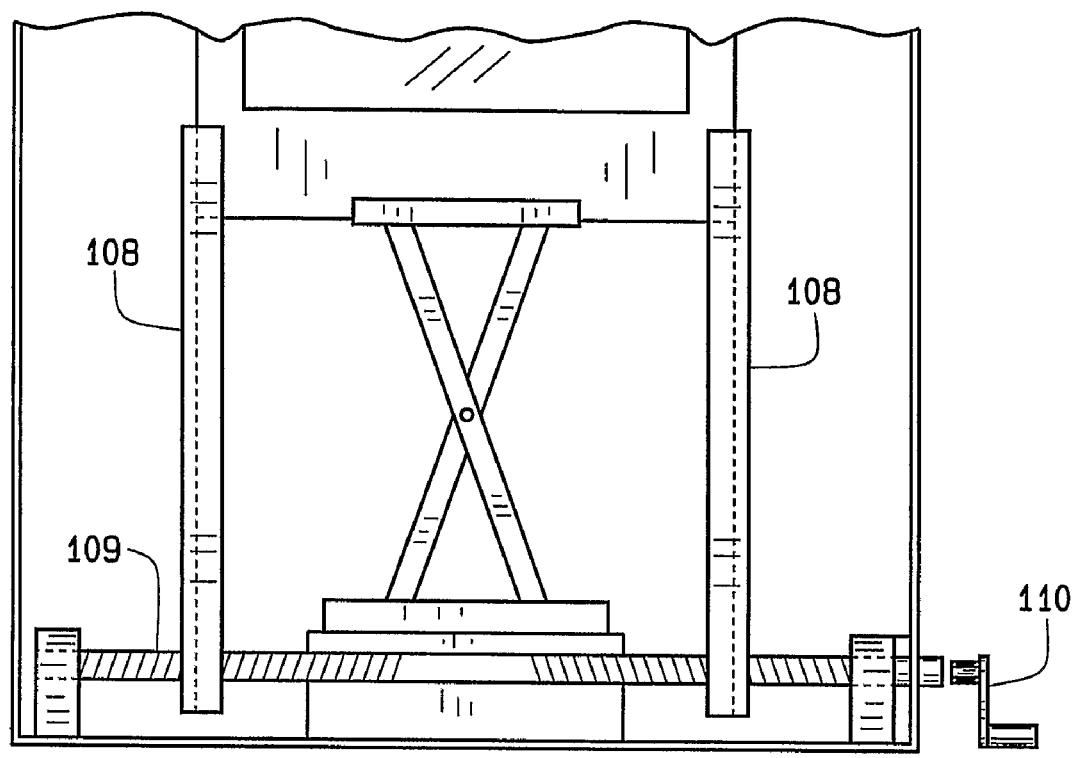
FIG. 7 is a fragmentary view in front elevation of one embodiment of adjustable channel arrangement.

FIG. 7 illustrates an elevating mechanism with adjustable channels 108 outboard of a jack or other elevating mechanisms. The vertical channels 108 can be moved toward and away from one another by an adjusting screw 109 operable by electrical power or by a mountable and removable crank 110.

Figure 8:
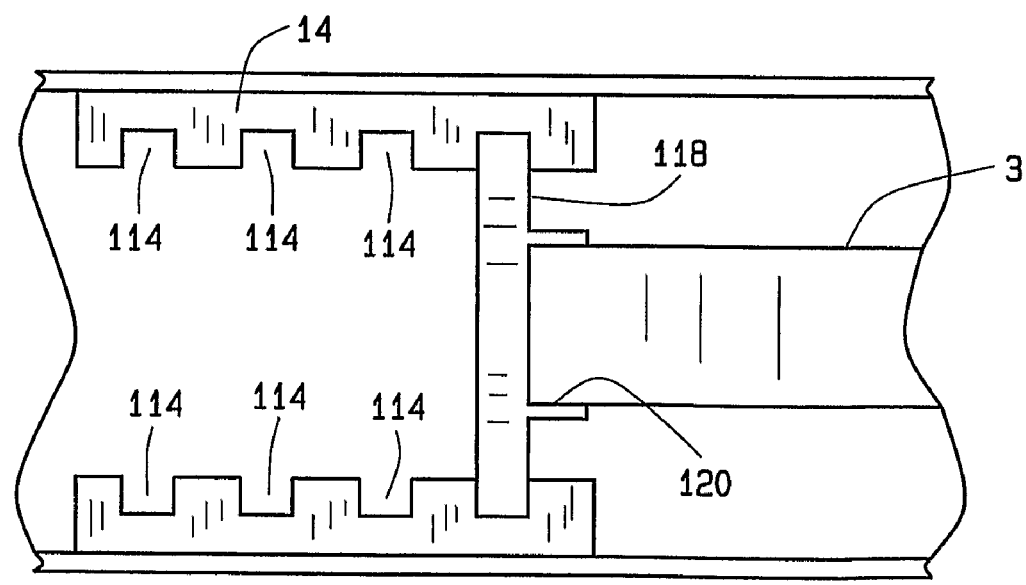
FIG. 8 is a fragmentary top plan view of yet another embodiment of adjustable channel arrangement.

In FIG. 8 an incrementally adjustable channel arrangement is illustrated. A pair of oppositely facing plates 14 with grooves 114 aligned transversely of the enclosure accept a base plate 118 carrying channel 120.

The examples of elevating mechanisms and other examples given have been merely illustrative. Numerous variations in the construction of the device of this invention, within the scope of the appended claims, will occur to those skilled in the art in light of the foregoing disclosure.

The invention claimed is:

1. In a modular container for a flat display panel, said container having broad front and rear walls and relatively narrow side walls to define a space to receive said flat display panel, and a top door that opens to permit the emergence of said display panel, the improvement comprising a mounting member within said container, a power mechanism which selectively raises and lowers said mounting member, a flat display panel carried by said mounting member, and vertical channels or geared tracks in said container positioned to receive side edges of said flat display panel and constructed to accommodate flat display panels of different widths or thickness, or both.

2. the improvement of claim 1 in which said container has at least one handle by which said container can be carried and a door in at least one of said broad walls.

3. In combination with a bed having a foot, a modular container for a flat display panel, said container having broad front and rear walls and relatively narrow side walls to define a space to receive said display panel, a mounting member within said container, a power mechanism selectively raises and lowers said mounting member, and a flat display carried by said mounting member, said container being mounted on or in the foot of said bed, said display comprising a television display on one side and a monitor on an opposite side.

4. The combination of claim 3, including structure which enables swinging or pivoting the screen to either side of the bed for side viewing.

5. The combination of claim 3 in which said container has at least one handle by which said container can be carried and a door in at least one of said broad walls.

6. In a modular container carrying a flat display, said container having broad front and rear walls and relatively narrow side walls to define a space to receive said display, and an open top, and a, power mechanism which selectively raises and lowers said flat display, the improvement comprising said display comprising a television display on one side and a monitor on an opposite side to permit viewing of the television by one person while at the time another person can view the monitor.

7. The improvement of claim 6, in which said container has at least one handle by which the container can be manually transported, and a door in at least one of said broad walls.

8. The method of optimizing the viewing by the occupant of a bed of a flat display panel mounted in or on a footboard of said bed comprising moving said footboard hence said panel, toward or away from said occupant.

9. The method of optimizing the viewing, by an occupant of a seat or bed, of a flat display panel carried by a modular container comprising providing said container with ground-engaging wheels selectively driven by a motor, providing a receptor which controls said motor, and providing a transmitter available to said occupant by which said modular container, hence said flat screen, can be moved by said ground engaging wheels with respect to said occupant.

10. In combination with a bed having a head and a foot, a modular container for a flat display panel, said container having broad front and rear walls and relatively narrow side walls to define a space to receive said display panel, a mounting member within said container, a first power mechanism selectively raises and lowers said mounting member, and a flat display panel carried by said mounting member, said container being mounted at or in the foot of said bed, and a second power mechanism which moves said container as a detached unit or together with the footboard toward and away from the head of said bed.

* * * * *